US012449770B2

(12) United States Patent
Wein et al.

(10) Patent No.: US 12,449,770 B2
(45) Date of Patent: Oct. 21, 2025

(54) CASE CAP RETAINER FOR A WATCH HAVING A CASE CAP

(71) Applicant: Hampden Corp., Chicago, IL (US)

(72) Inventors: Joseph Wein, Chicago, IL (US); Marc Cain, Nashville, TN (US); Cathy Lennox, Cape Town (ZA); Nicole Kaestner, Chicago, IL (US); Alan Grunwald, New York, NY (US)

(73) Assignee: Hampden Corp., Chicago, IL (US)

( * ) Notice: Subject to any disclaimer, the term of this patent is extended or adjusted under 35 U.S.C. 154(b) by 0 days.

(21) Appl. No.: 18/898,804

(22) Filed: Sep. 27, 2024

(65) Prior Publication Data

US 2025/0021052 A1 Jan. 16, 2025

Related U.S. Application Data

(63) Continuation-in-part of application No. 29/882,519, filed on Jan. 16, 2023, now Pat. No. Des. 1,072,657.

(51) Int. Cl.
*G04B 37/00* (2006.01)
*G04B 27/08* (2006.01)
*G04B 47/04* (2006.01)

(52) U.S. Cl.
CPC ........... *G04B 37/005* (2013.01); *G04B 27/08* (2013.01); *G04B 37/0033* (2013.01); *G04B 47/046* (2013.01)

(58) Field of Classification Search
CPC .. G04B 37/005; G04B 37/0033; G04B 27/08; G04B 47/046
See application file for complete search history.

(56) References Cited

U.S. PATENT DOCUMENTS

| | | | | |
|---|---|---|---|---|
| 372,113 A | | 10/1887 | Bonneau | |
| 494,725 A | | 4/1893 | Sweetser | |
| 753,473 A | | 3/1904 | Cunningham | |
| D64,829 S | | 6/1924 | Whitehead | |
| D67,387 S | | 5/1925 | Whitehead | |
| D67,388 S | | 5/1925 | Whitehead | |
| D235,741 S | | 7/1975 | Friedman | |
| 4,626,107 A | * | 12/1986 | Nishikawa ........... | G04B 19/283 968/212 |

(Continued)

OTHER PUBLICATIONS

Hampden Watch Facebook I facebook. com; posted Oct. 8, 2023 [online]. © Meta 2024 [retrieved Sep. 26, 2024] from Internet: https://www.facebook.com/hampdenwatch, pp. 1-5.

(Continued)

*Primary Examiner* — Edwin A. Leon
*Assistant Examiner* — Jason M Collins
(74) *Attorney, Agent, or Firm* — GrowIP Law Group LLC

(57) ABSTRACT

The disclosure provides an example watch. The watch includes (a) a housing having a first face and a second face and a cavity extending therebetween, where the first face includes a first bezel coupled to a first transparent watch crystal, (b) a disc disposed within the cavity between the first face and the second face and coupled to the housing, where the disc comprises a watch face for indicating time, and (c) a case cap removably coupled to the second face of the housing, where the case cap includes a casing having a first side configured to mate with the second face of the housing and a second side configured to be engraved.

28 Claims, 11 Drawing Sheets

(56) References Cited

U.S. PATENT DOCUMENTS

| | | | | |
|---|---|---|---|---|
| 4,845,694 | A | 7/1989 | Vuilleumier | |
| 5,467,325 | A * | 11/1995 | Juillerat | G04B 37/11 368/291 |
| 5,652,736 | A | 7/1997 | Lee | |
| 6,761,479 | B2 * | 7/2004 | Meyrat | G04B 37/0008 368/310 |
| 8,142,069 | B2 * | 3/2012 | Muller | G04B 37/00 368/310 |
| D673,069 | S | 12/2012 | Monachon | |
| D727,770 | S | 4/2015 | Kummer | |
| D765,532 | S | 9/2016 | Nichol | |
| 9,760,064 | B2 * | 9/2017 | Kim | G06F 1/163 |
| D855,487 | S | 8/2019 | Schaad | |
| D928,010 | S | 8/2021 | Balayer | |
| 11,668,996 | B1 | 6/2023 | Devine et al. | |
| 11,698,607 | B2 * | 7/2023 | Haering | G04B 19/286 368/310 |
| 12,124,220 | B2 * | 10/2024 | Tschumi | G04B 37/11 |
| 2008/0225650 | A1 * | 9/2008 | Muller | G04B 37/0008 368/310 |
| 2009/0073816 | A1 * | 3/2009 | Ozawa | G04B 39/02 368/300 |
| 2009/0303843 | A1 | 12/2009 | Albano | |
| 2013/0258473 | A1 | 10/2013 | Bandy | |
| 2016/0037877 | A1 * | 2/2016 | Perkins | A44C 5/147 224/164 |
| 2016/0313702 | A1 | 10/2016 | Jufer et al. | |
| 2018/0343986 | A1 * | 12/2018 | Lukens | A44C 5/147 |
| 2020/0019120 | A1 * | 1/2020 | Gauche | G04B 37/0041 |
| 2020/0393796 | A1 | 12/2020 | Silvant | |
| 2021/0088975 | A1 * | 3/2021 | Tschumi | G04B 37/08 |
| 2022/0026853 | A1 * | 1/2022 | Takahashi | G01D 11/24 |
| 2022/0050423 | A1 * | 2/2022 | Allimann | G04B 37/11 |
| 2023/0068766 | A1 * | 3/2023 | Tschumi | G04B 37/11 |
| 2023/0176525 | A1 | 6/2023 | Allimann et al. | |
| 2023/0259072 | A1 * | 8/2023 | Geiser | G04B 37/0075 368/243 |

OTHER PUBLICATIONS

JJC L39 19mm Ultra Slim Multi-Coated UV Filter for Sony I amazon.com; date first avail. Sep. 22, 2011 [online]. © 1996-2024, Amazon.com, Inc [retrieved Sep. 26, 2024] from Internet: https://www.amazon.com/Multi-Coated-Filter-Hardness-Scratch-Resistant/dp /B00AHTLM6K, pp. 1-12.

* cited by examiner

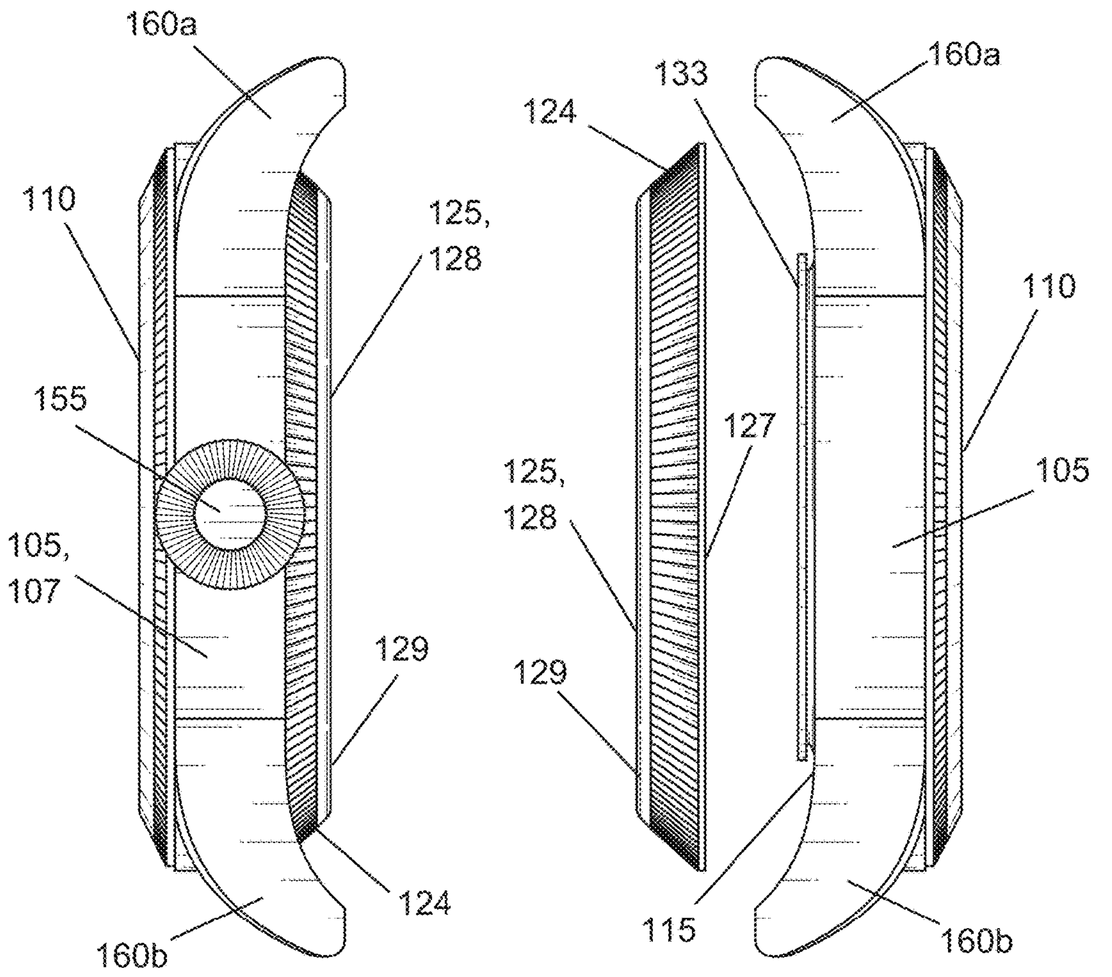
FIG. 4
FIG. 5
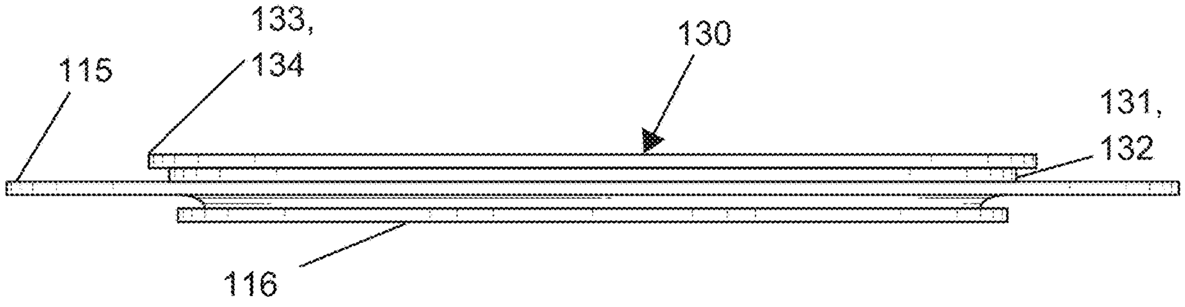
FIG. 6

CASE CAP RETAINER FOR A WATCH HAVING A CASE CAP

CROSS-REFERENCE TO RELATED APPLICATION

This application is a U.S. Continuation-in-Part Patent Application that claims priority to U.S. Design patent application Ser. No. 29/882,519, filed on Jan. 16, 2023, that is hereby incorporated by reference in its entirety.

BACKGROUND

Early mechanical watches serve the purpose of a time-indicating device, but now also act as a fashion accessory for consumers. The existing watch design for mechanical movement mostly adopts the traditional hour hand, minute hand, and second hand for time indication. The axes of the hour hand, minute hand, and second hand are typically all positioned at the same point, although some designs have them arranged at different positions on the watch face. The operation of the hands of a wristwatch is generally determined by a gear system of a wristwatch.

Watches evolved to include automatic movement such that watches may be self-winding. An automatic watch captures energy from the movements of the wearer's wrist using a weighted mechanism and stores the energy in a watch's mainspring.

Since the advent of automatic movement, quartz movement has been developed. A quartz watch relies on a battery, thereby eliminating the need for winding by the wearer. The battery in a quartz watch generates an electric current that creates a vibration in a piece of quartz inside the watch. This piece of quartz vibrates at a specific frequency to maintain the accuracy of the watch's time indication.

The design and purpose of the foregoing watches are to indicate time.

SUMMARY

The disclosure provides a case cap apparatus and a watch apparatus having a case back configured to be removably coupled to the case cap. This novel system advantageously permits a first removable case cap to be exchanged with a second removable case cap, for example, to swap out engravings or other personalization or alternative materials, such as different metals. When the case caps are exchanged, the case back remains in place protecting the watch movement control system.

In one beneficial implementation, a case cap retainer is coupled to the case back of the watch for removable coupling with the case cap apparatus. This variation permits removal and attachment of the case cap to the base back by a user without resort to a separate tool or other implement and without servicing by a professional jeweler.

In a first aspect, an example watch is disclosed. The watch includes (a) a housing having a first face and a second face and a cavity extending therebetween, where the first face includes a first bezel coupled to a first transparent watch crystal, (b) a disc disposed within the cavity between the first face and the second face and coupled to the housing, where the disc includes a watch face for indicating time, and (c) a case cap removably coupled to the second face of the housing, where the case cap comprises a casing having a first side configured to mate with the second face of the housing and a second side configured to be engraved.

In a second aspect, an example case cap for coupling to a case back of a watch is disclosed. The case cap includes (a) a casing that is circular and has a first side configured to mate with a case back of a watch housing and a second side includes a planar surface configured to be laser engraved or acid engraved, and (b) an opening arranged on the first side of the casing and configured to receive a case cap retainer therethrough, where the casing defines a cavity in communication with the opening, where the cavity is sized and shaped to receive at least a portion of the case cap retainer and to permit rotation of a retention rim of the case cap retainer.

The features, functions, and advantages discussed herein can be achieved independently in various examples or may be combined in yet other examples, further details of which can be seen with reference to the following description and drawings.

BRIEF DESCRIPTION OF THE DRAWINGS

FIG. 4 is a right side elevational view of the watch with the case cap coupled to the case back of the watch, according to one example implementation;

FIG. 5 is a left side elevational view of the watch with the case cap arranged in the uncoupled position, according to one example implementation;

FIG. 6 is a front elevational view of the case cape retainer coupled to the case back of the watch, according to one example implementation;

Figure 1:
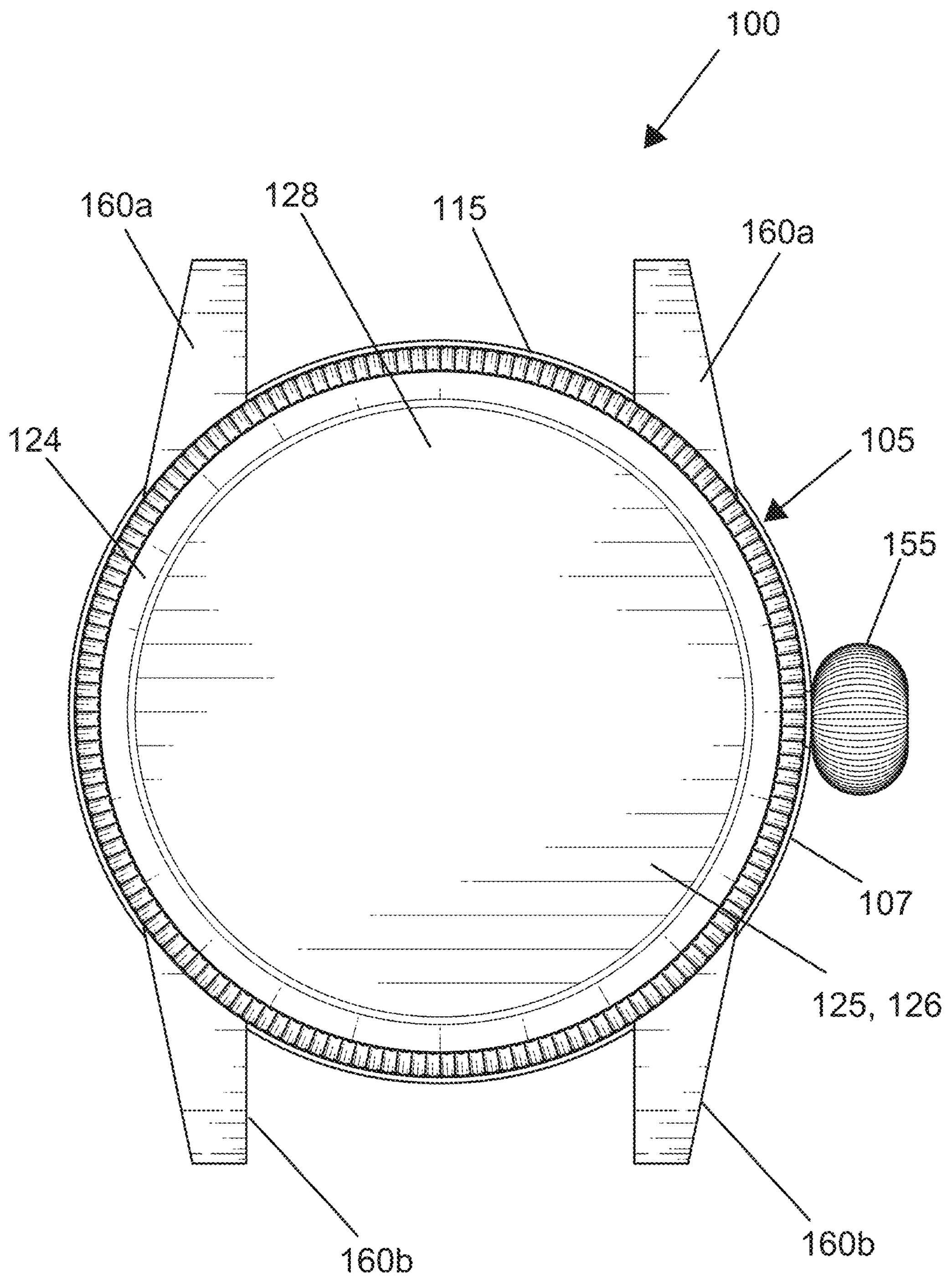
FIG. 1 is a bottom plan view showing a watch with a case cap coupled to a case back of the watch, according to one example implementation.

The drawings are for the purpose of illustrating examples, but it is understood that the inventions are not limited to the arrangements and instrumentalities shown in the drawings.

DETAILED DESCRIPTION

FIGS. 1-20 depict a watch 100 that includes a housing 105 having a first face 110 and a second face 115 and a cavity 106 extending therebetween. The first face 110 includes a first bezel 111 coupled to a first transparent watch crystal 112. The watch 100 further includes a disc 120 disposed within the cavity 106 between the first face 110 and the second face 115 and coupled to the housing 105. The disc 120 includes a watch face 121 for indicating time. The watch 100 also includes a case cap 125 removably coupled to the second face 115 of the housing 105. The case cap 125 includes a casing 126 having a first side 127 configured to mate with the second face 115 of the housing 105 and a second side 128 configured to be engraved.

In one optional implementation, shown in FIGS. 2, 5-6, 9, 11-15, and 17-18, the watch 100 includes a case cap retainer 130 coupled to the second face 115 of the housing 105. The case cap 125 is removably coupled to the case cap retainer 130. As shown in FIG. 6, the case cap retainer 130 has a support 131 at a first end 132 coupled to the second face 115 of the housing 105 and a retention rim 133 at a second end 134.

Figure 7:
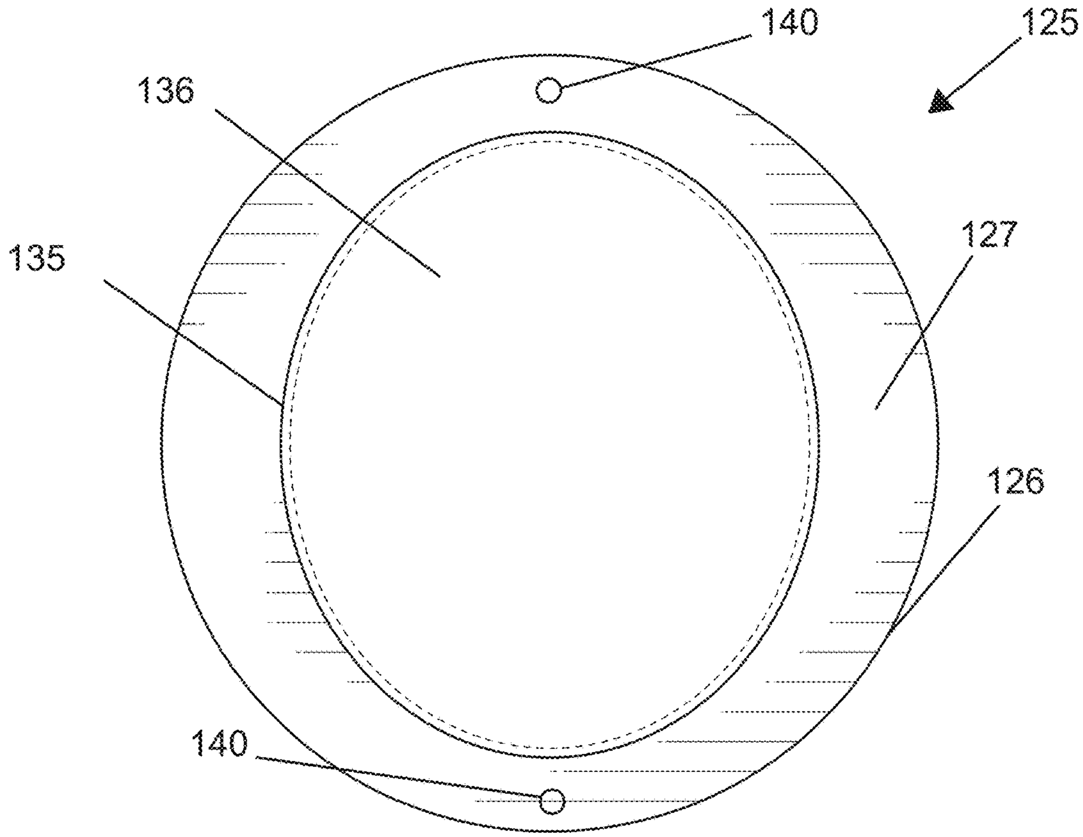
FIG. 7 is a top plan view of the first side of the casing of the case cap in the uncoupled position, according to one example implementation.
Figure 17:
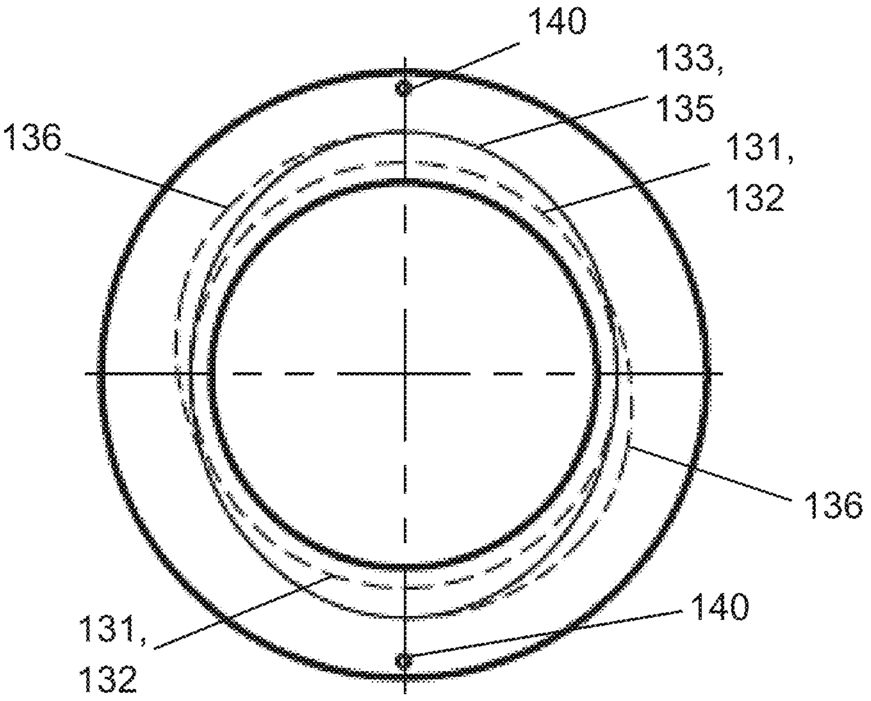
FIG. 17 is a top view of the case cap in interfacial engagement with the case back such that the case cap retainer is in alignment with the opening of the case cap and resides in the cavity of the case cap in a unlocked position prior to rotation or removal, according to one example implementation.
Figure 18:
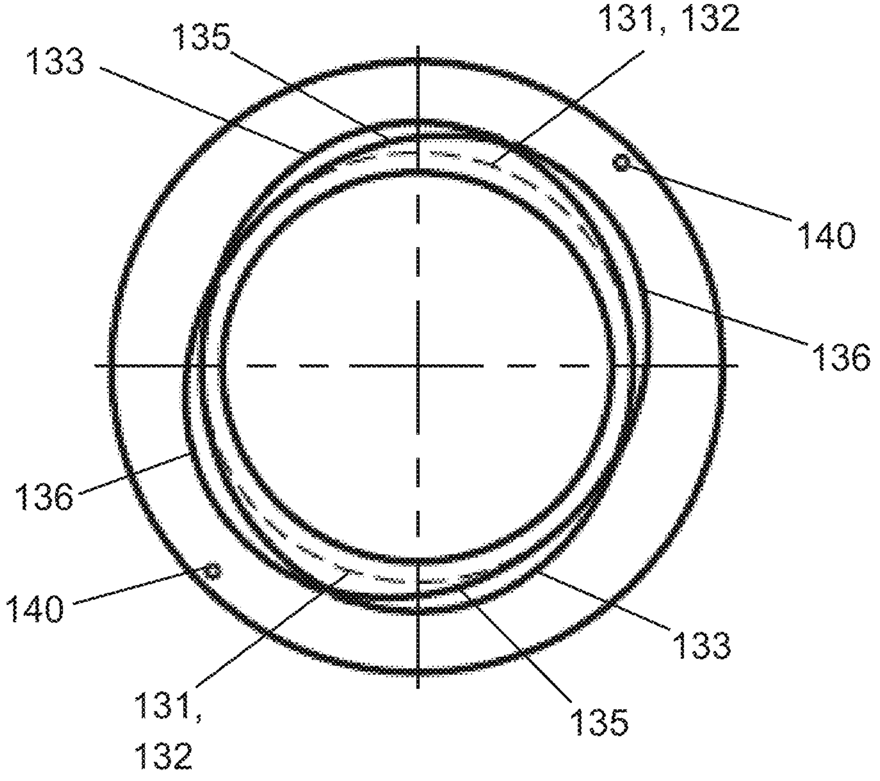
FIG. 18 is a top view of the case cap in interfacial engagement with the case back such that the case cap retainer has been rotated in the cavity of the case cap and out of alignment with the opening of the case cap such that case cap in a locked position and coupled to the case back, according to one example implementation.

In this example implementation, as shown in FIG. 7, the case cap 125 has an opening 135 arranged on the first side 127 of the casing 126 and is configured to receive the case cap retainer 130 therethrough. The casing 126 defines a cavity 136 in communication with the opening 135. As shown in FIG. 17, the cavity 136 is sized and shaped to receive at least a portion of the case cap retainer 130 and to permit rotation of the retention rim 133 to a locked position on the housing 105 such that the retention rim 133 of the case cap retainer 130 is out of alignment with the opening 135 of the casing 126 of the case cap 125, as shown in FIG. 18.

Figure 14:
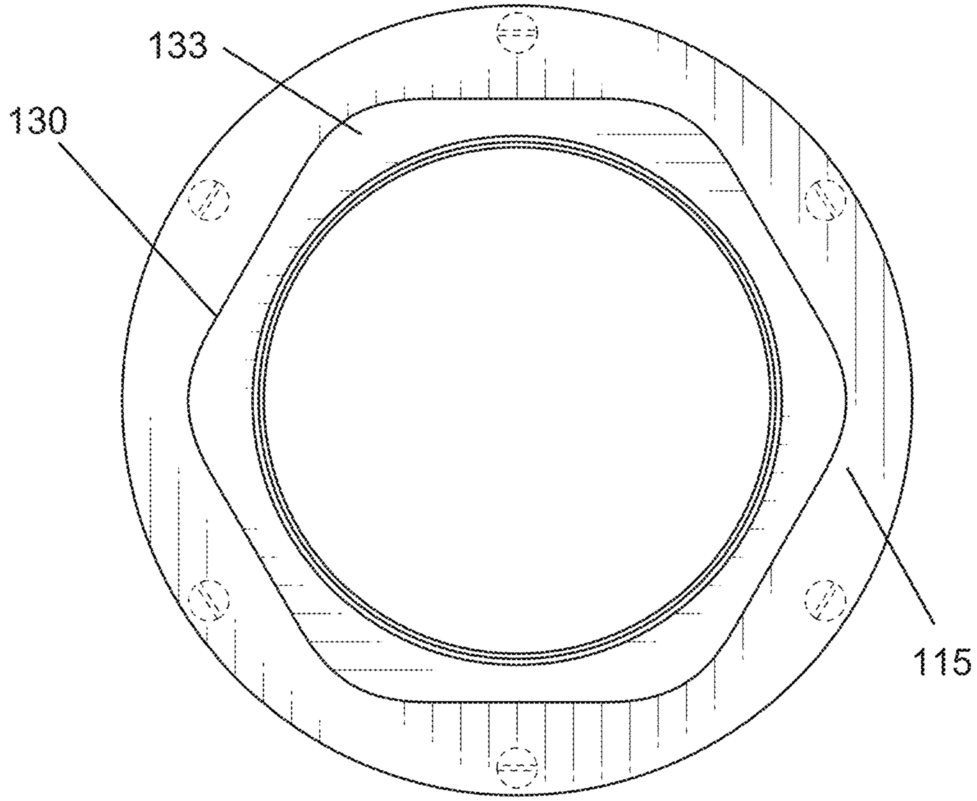
FIG. 14 is a bottom plan view of the case cap retainer having a hexagonal shape, according to one example implementation.
Figure 15:
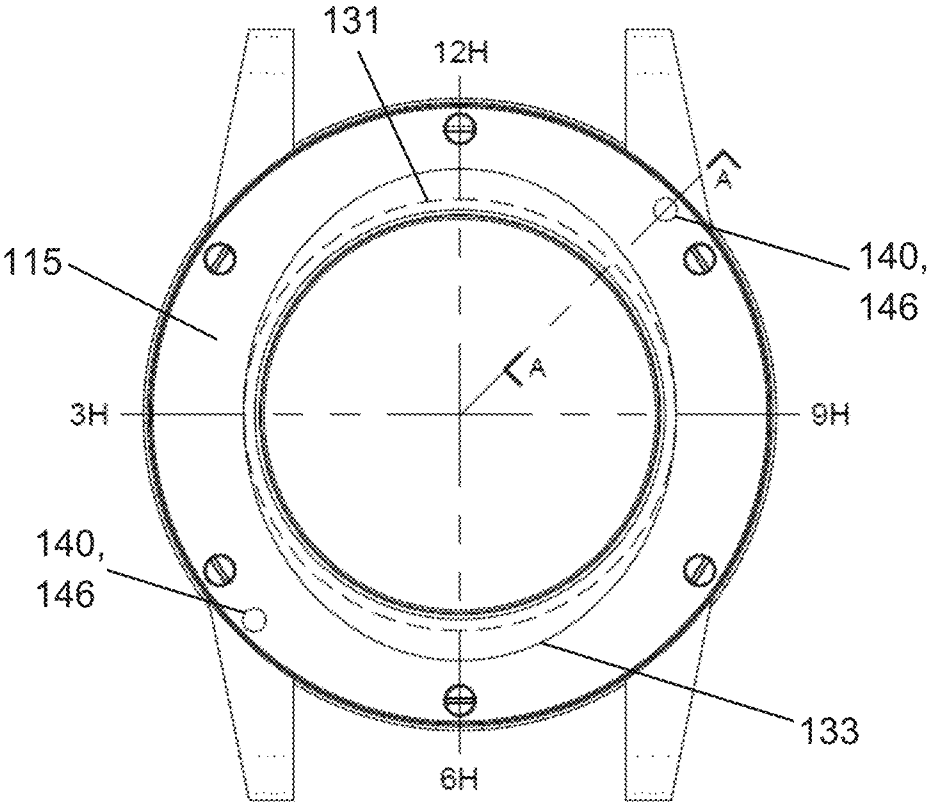
FIG. 15 is a bottom plan view of the case cap retainer coupled to the case back on the watch with a reciprocal locking mechanism, according to one example implementation.

In an optional implementation, a shape of the opening 135 in the case cap 125 and a shape of the retention rim 133 are the same. For example, the shape of the retention rim 133 is oval (FIG. 9), triangular (FIG. 11), rectangular or square (FIG. 12), pentagonal (FIG. 13), or hexagonal (FIG. 14).

In another optional implementation, the watch 100 includes at least one locking mechanism 140 having reciprocal male 141 and female 142 components coupled to the first side 127 of the casing 126 of the case cap 125 and the second face 115 of the housing 105. In a further optional implementation, shown in FIG. 16, the at least one locking mechanism 140 is in the form of a ball detent 142 coupled to or defined by one of the second face 115 of the housing 105 and the first side 127 of the casing 126 of the case cap 125 and a ball plunger 141, not limited to but including a capsa ball, coupled to the other of the second face 115 of the housing 105 and the first side 127 of the casing 126 of the case cap 125.

In operation, the male and female components 141, 142 of the at least one locking mechanism 140 are out of alignment when the case cap retainer 130 is received through the opening 135 of the casing 126 of the case cap 125 in an unlocked position. When the case cap 125 is rotated about the support 131 of the case cap retainer 130, the male and female components 141, 142 of the at least one locking mechanism 140 are aligned and mated together in the locked position. In various implementations, the at least one locking mechanism 140 may provide haptic or audible feedback when the male and female components 141, 142 initially engage with each other.

In another optional implementation, as shown in FIGS. 17-18, the cavity 136 of the casing 126 of the case cap 125 is sized and shaped to permit the retention rim 133 of the case cap retainer 130 to rotate at least 15 degrees within the cavity 136. Rotation of the retention rim 133 in this manner causes the retention rim 133 to move out of alignment with the opening 136 in the case cap 125 such that the case cap is retained on the housing of the watch. The retention rim 133 may be rotated back into alignment with the opening 135 of the case cap 125 to remove the case cap 125 from the case back 115 of the watch 100. In a further example implementation, the cavity 136 of the casing 126 of the case cap 125 is sized and shaped to permit the retention rim 133 of the case cap retainer 130 to rotate up to seventy-five degrees.

In one optional implementation, the at least one locking mechanism 140 includes two locking mechanisms arranged 180 degrees apart on the second face 115 of the housing 105 and 180 degrees apart on the first side 127 of the casing 126 of the case cap 125.

Figure 19:
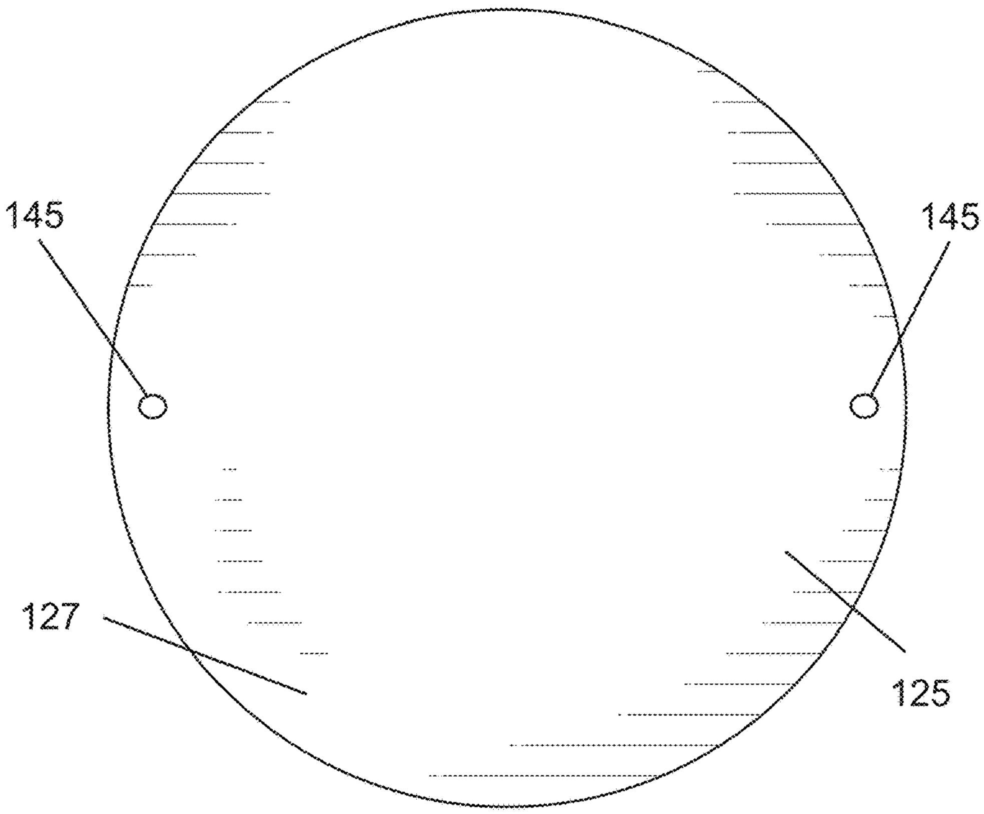
FIG. 19 is a top plan view of the first side of the casing of the case cap in the uncoupled position, according to one example implementation.
Figure 20:
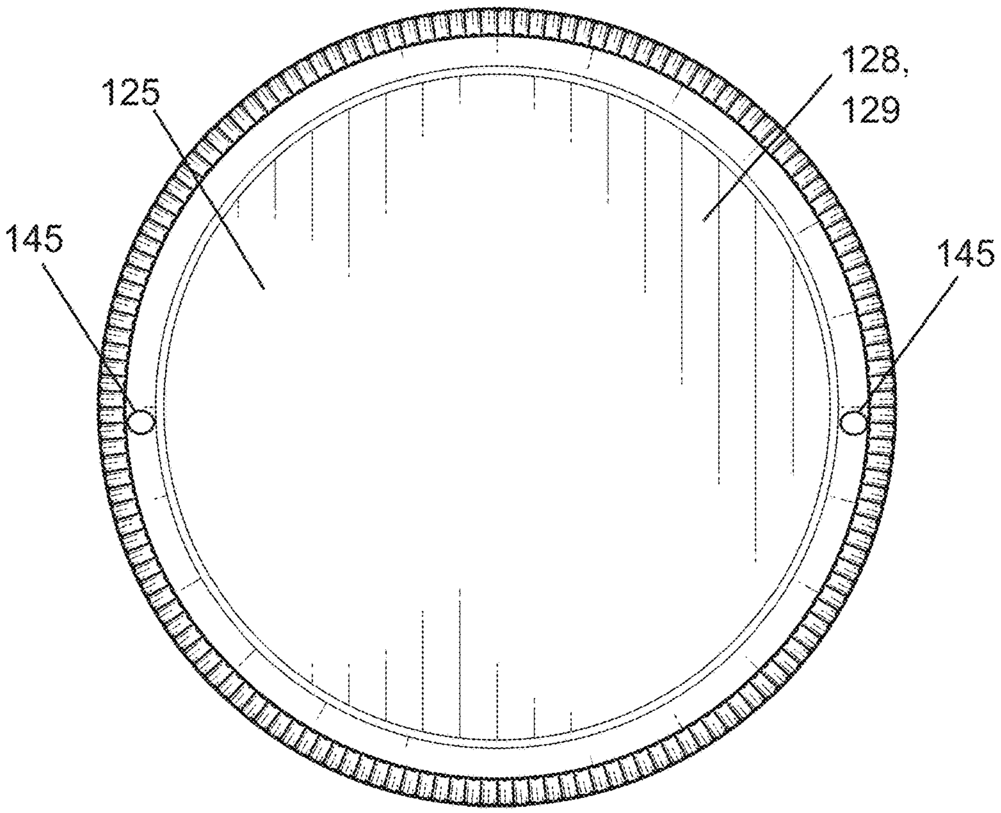
FIG. 20 is a bottom plan view of the second side of the casing of the case cap in the uncoupled position, according to one example implementation.

In an alternative optional implementation, as shown in FIGS. 19-20, an outer circumference 124 of the case cap 125 contains at least one through-hole 145 configured to receive a removable connector in the form of a threaded screw, wherein the second face 115 of the housing 105 includes at least one threaded cavity 146 configured to receive the threaded screw when the at least one through-hole 145 of the case cap 125 is concentrically aligned with the at least one threaded cavity 146 in the second face 115 of the housing 105.

Figure 8:
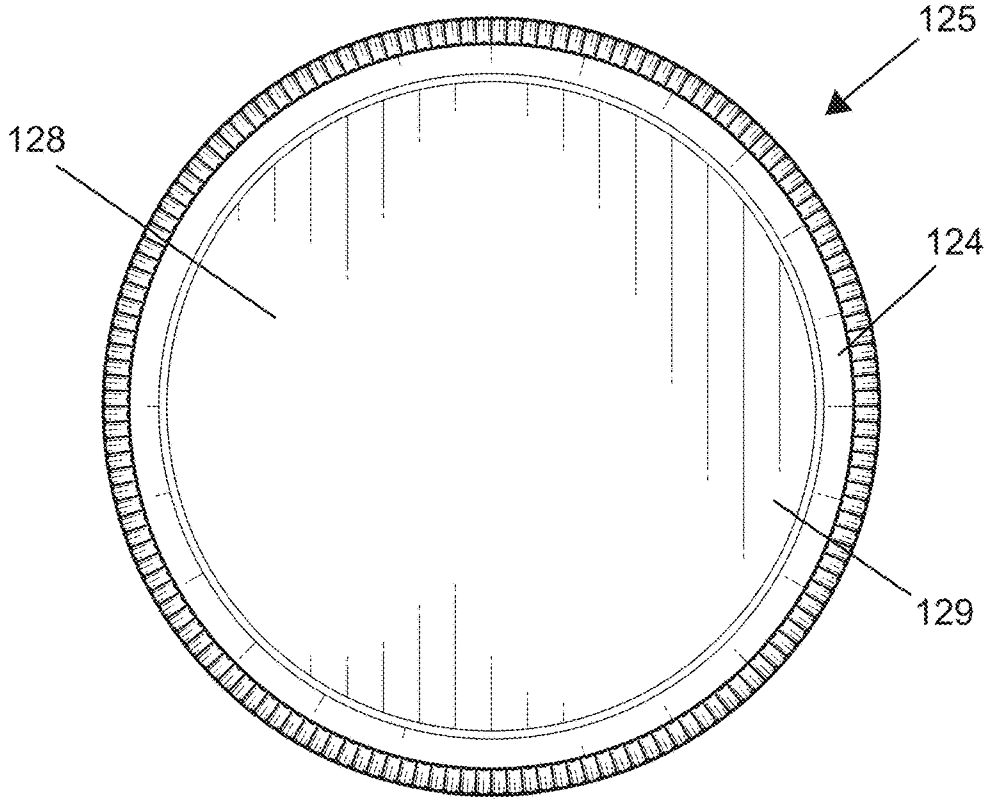
FIG. 8 is a bottom plan view of the second side of the casing of the case cap in the uncoupled position, according to one example implementation.
Figure 9:
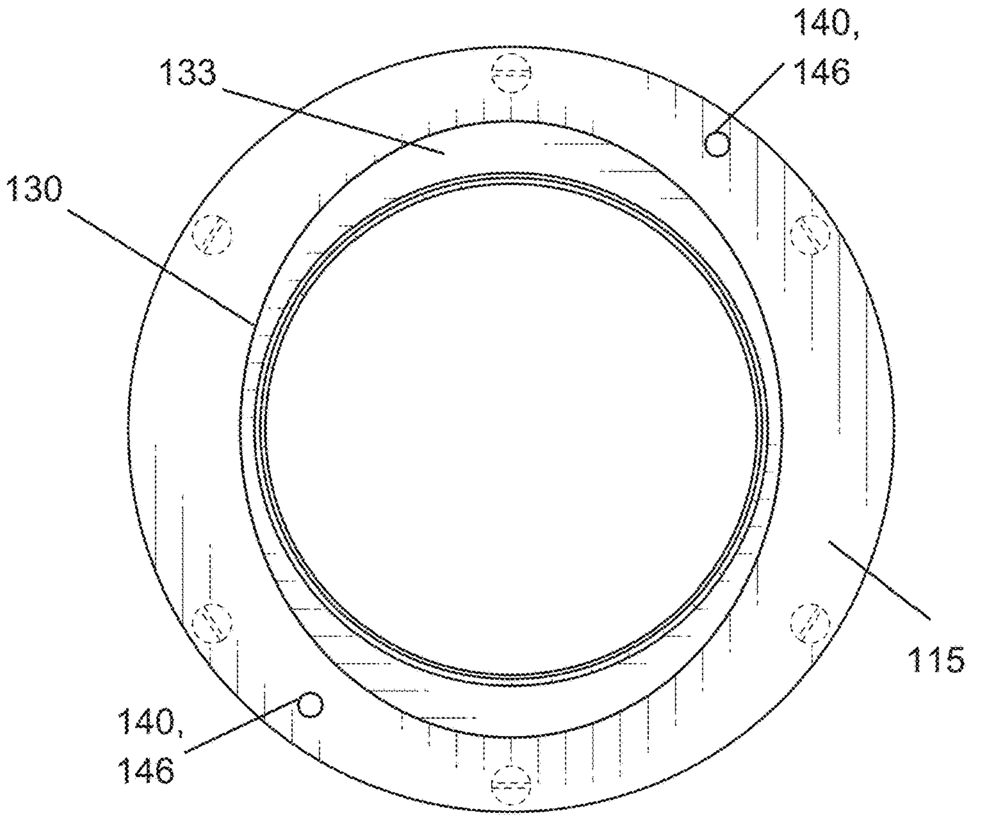
FIG. 9 is a bottom plan view of the case cap retainer, according to one example implementation.
Figure 10:
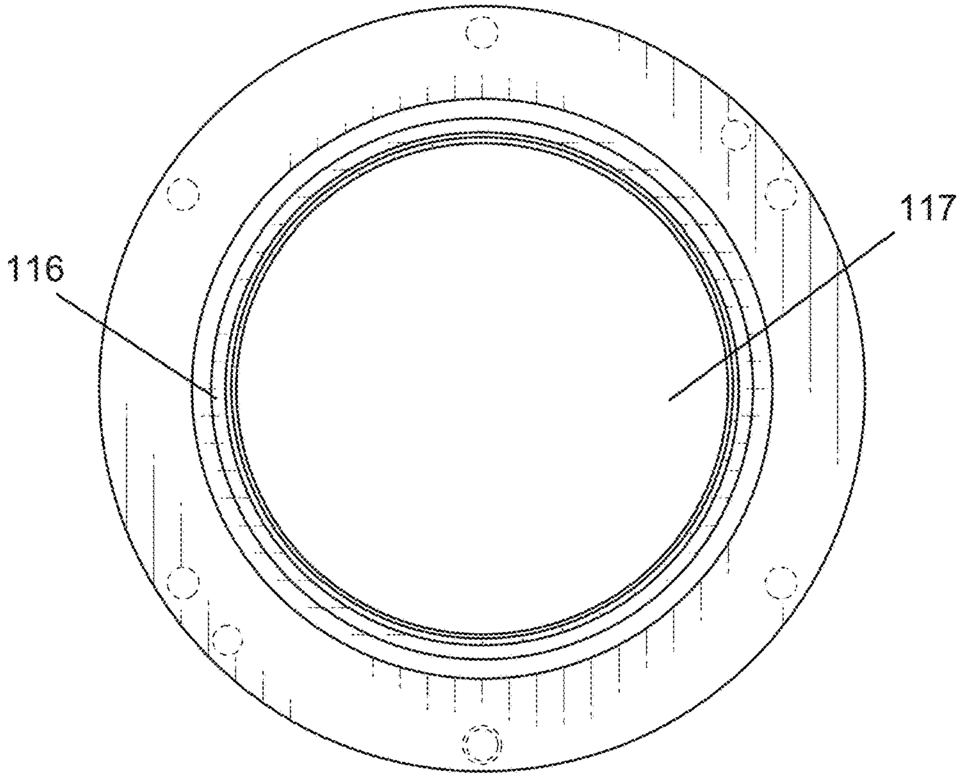
FIG. 10 is a top plan view of the case cap retainer, according to one example implementation.
Figure 11:
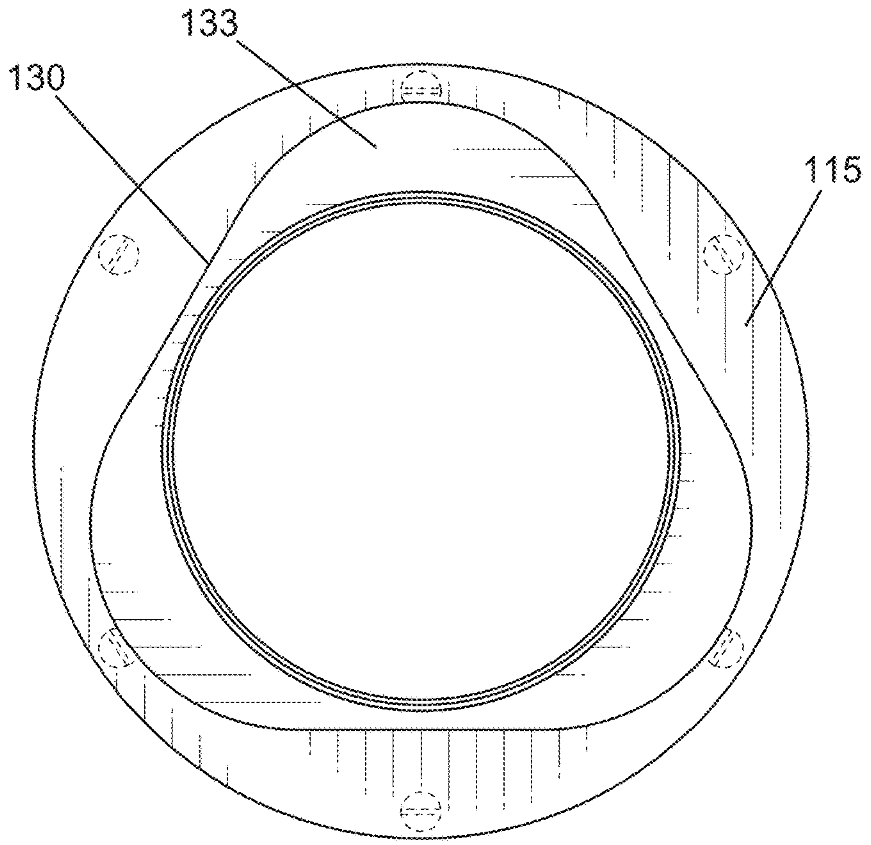
FIG. 11 is a bottom plan view of the case cap retainer having a triangular shape, according to one example implementation.
Figure 12:
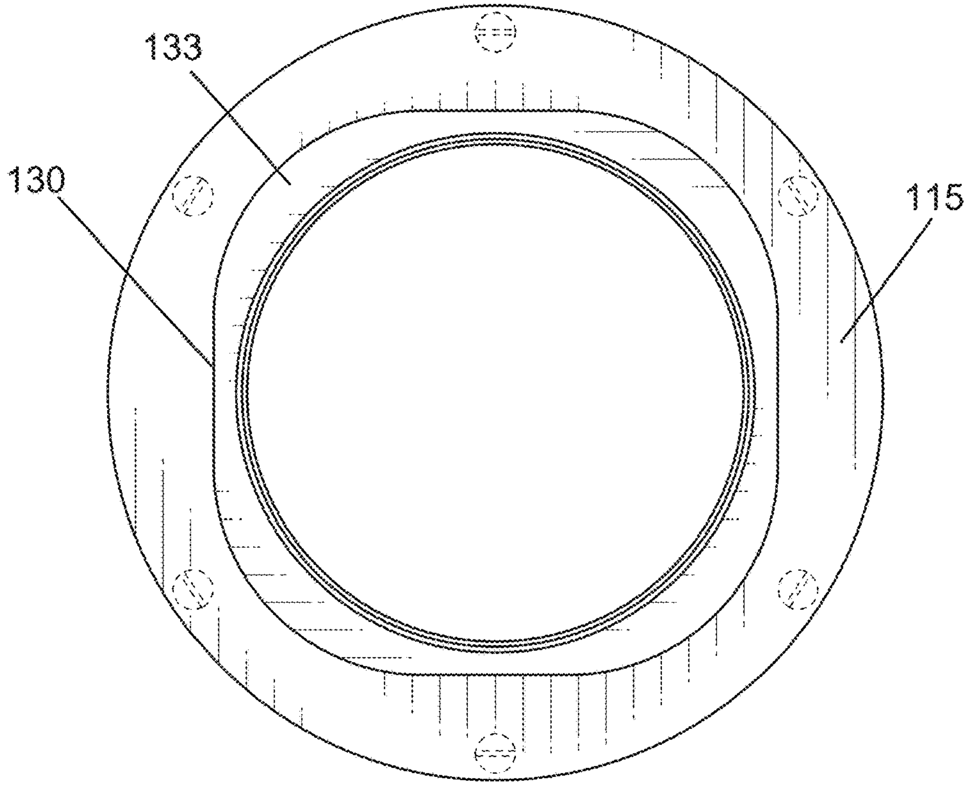
FIG. 12 is a bottom plan view of the case cap retainer having a rectangular or square shape, according to one example implementation.
Figure 13:
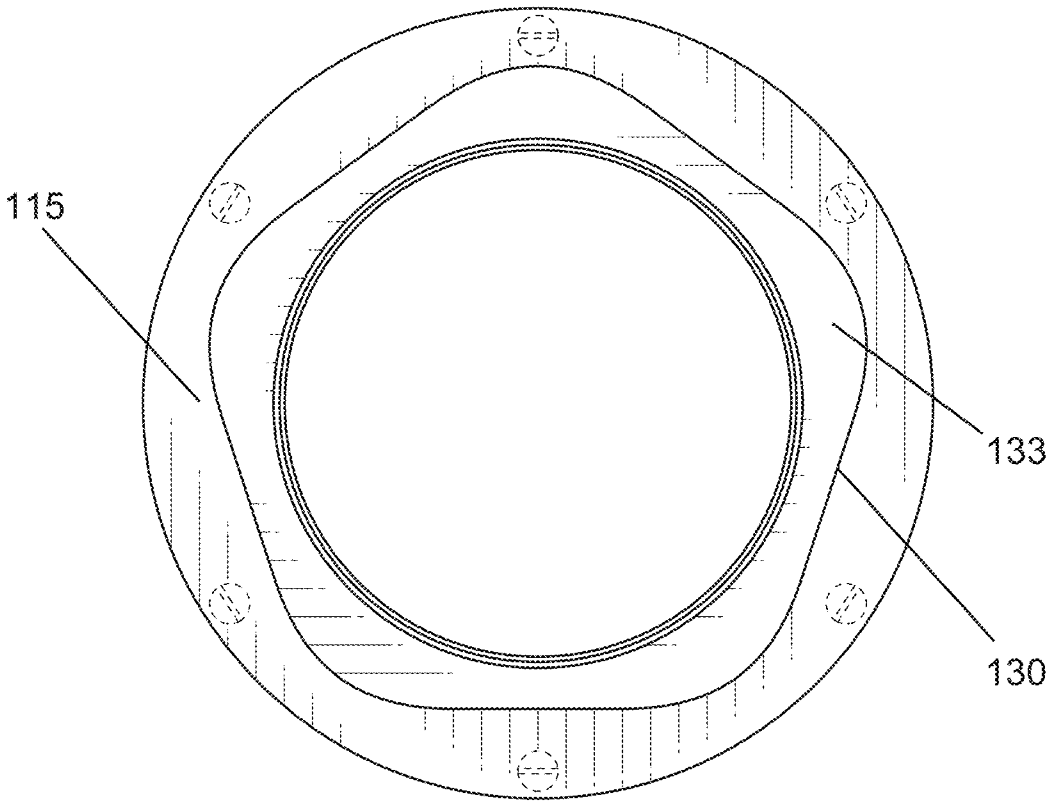
FIG. 13 is a bottom plan view of the case cap retainer having a pentagonal shape, according to one example implementation.

In an another optional implementation, shown in FIG. 8, a second side 128 of the casing 126 of the case cap 125 includes a planar surface 129 configured to be laser engraved or acid engraved. In a further optional implementation, an outer circumference 124 of the case cap 125 is chamfered.

Figure 2:
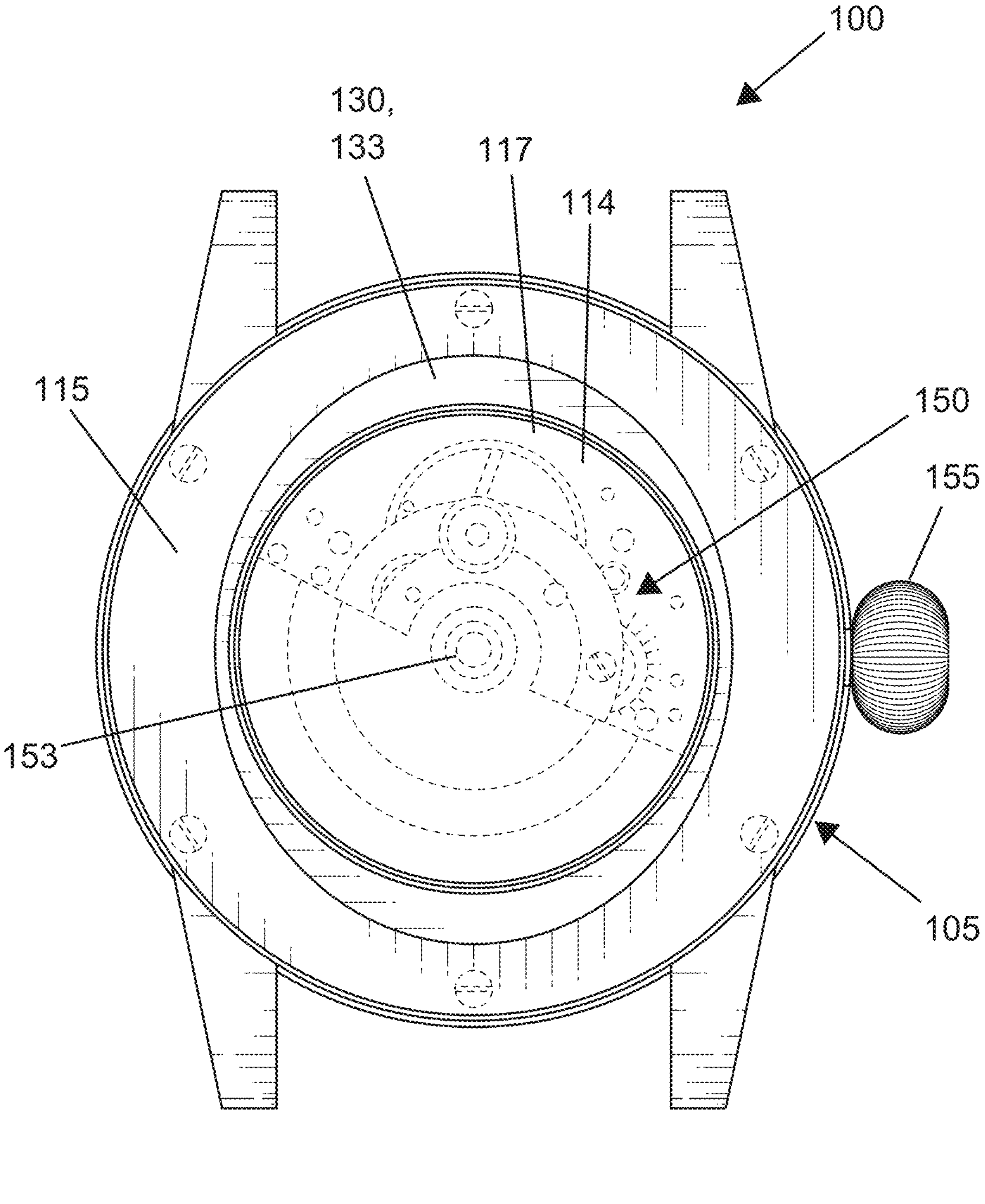
FIG. 2 is a bottom plan view showing a case cap retainer coupled to the case back of the watch with the case cap removed, according to one example implementation.
Figure 3:
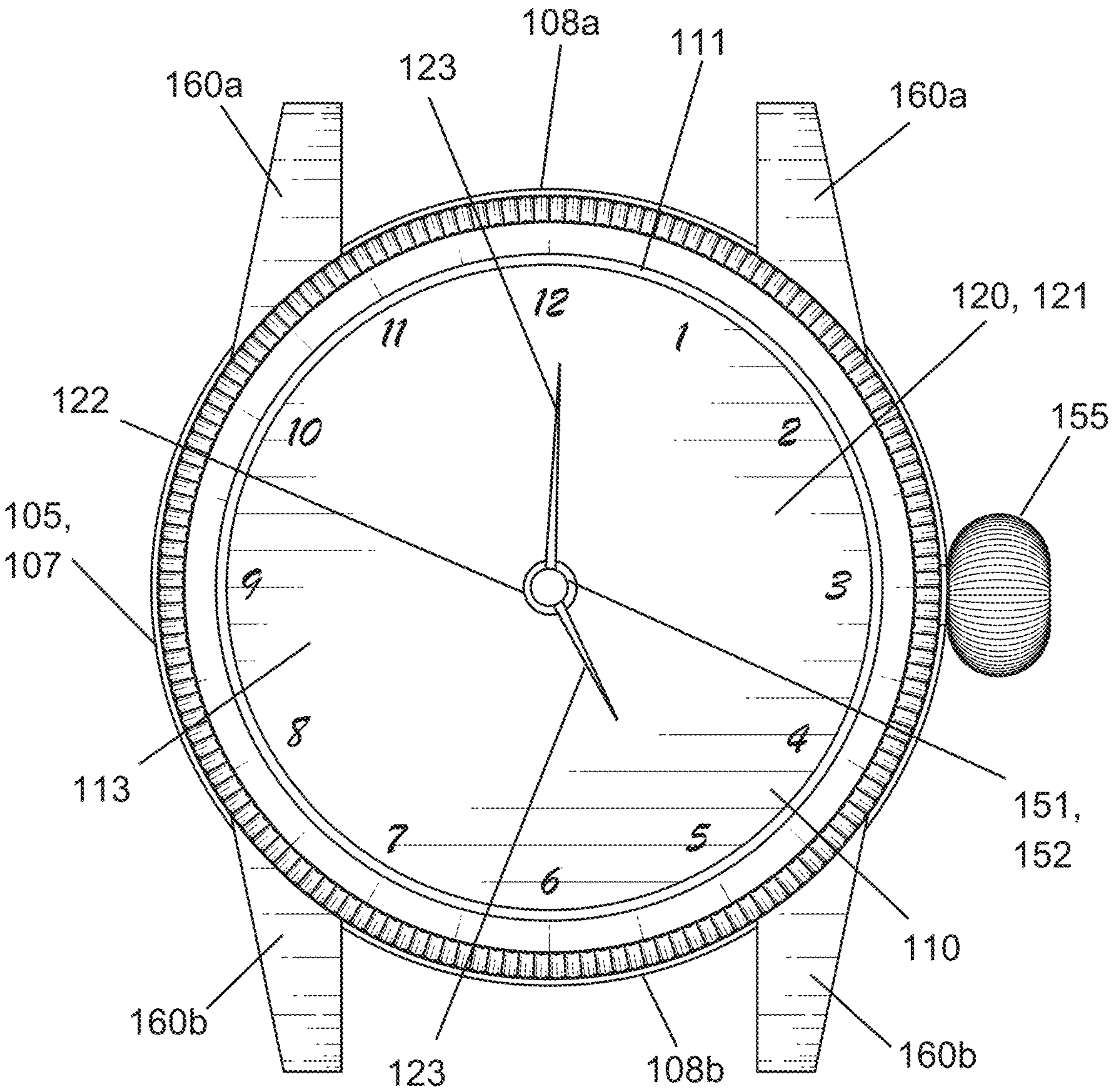
FIG. 3 is a top plan view of a first face of a housing of the watch, according to one example implementation.
Figure 16:
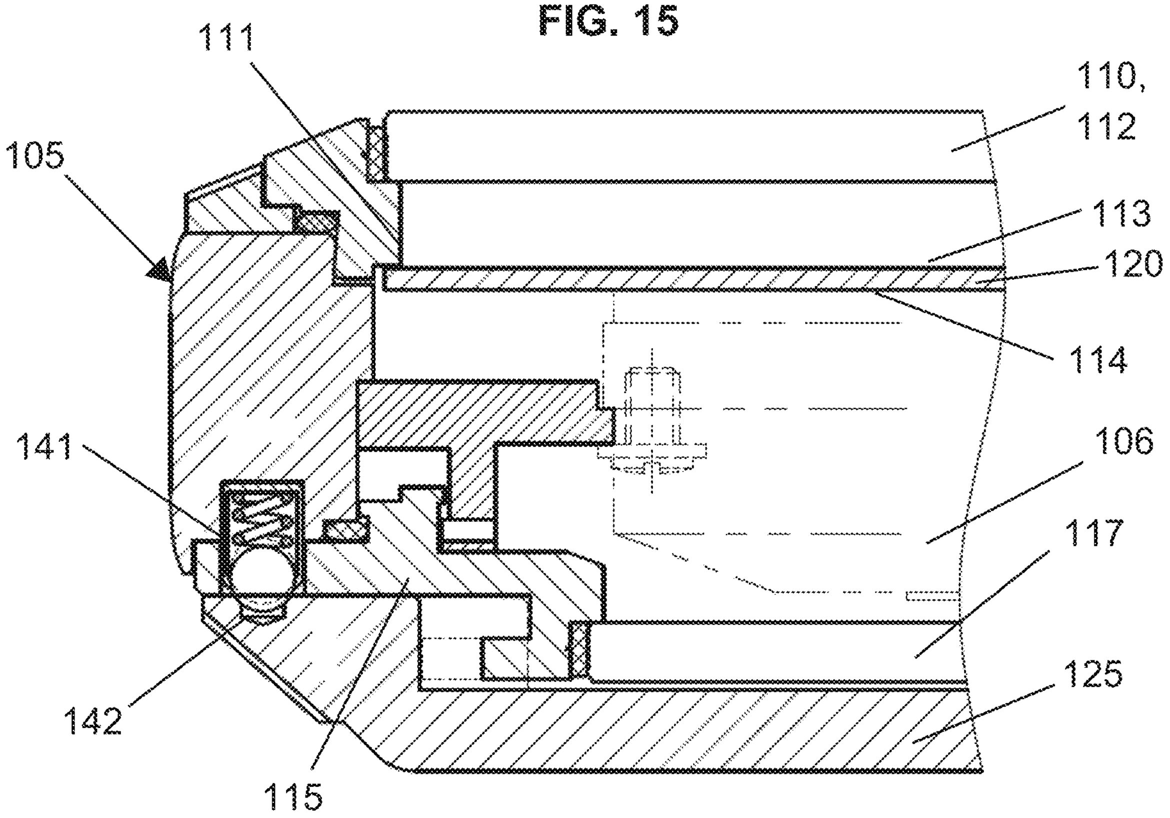
FIG. 16 is a side cross-sectional view of the reciprocal locking mechanism taken through line A-A in FIG. 15 with a male ball plunger coupled to the case back and seated in a female ball detent coupled to the case cap, when the case cap is in the locked position, according to one example implementation.

In a yet another optional implementation, as shown in FIGS. 2 and 16, the second face 115 of the housing 105 includes a second bezel 116 coupled to a second transparent watch crystal 117. This implementation permits a watch movement control system 150, including for example, gears and spindles, to be observed when the case cap 125 is uncoupled from the case back 115 of the watch 100. In an alternative implementation, the second face 115 of the housing 105 is opaque.

In yet another optional implementation, the disc 120 has a through-hole 122 arranged in the center of the disc 120. In this implementation, the watch 100 further includes a shaft 151 disposed within the through-hole 122 of the disc 120. The watch 100 includes at least one hand 123 for indicating time coupled to a first end 152 of the shaft 151 between the first face 110 of the housing 105 and a first side 113 of the disc 120. The watch 100 also includes a watch movement control system 150 coupled to the second end 153 of the shaft 151 between the second side 114 of the disc 120 and the second face 115 of the housing 105.

In a further optional implementation, the watch 100 includes a rotatable knob 155 coupled to the watch movement control system 150 and configured to move the at least one hand 123 for indicating time. The rotatable knob 155 is coupled to a side 107 of the housing 105 between the first face 110 and the second face 115.

In still another optional implementation, the watch 100 includes two pairs of lugs 160*a*, 160*b* extending from opposite ends 108*a*, 108*b* of the housing 105 between the first face 110 and the second face 115.

In a second aspect of the disclosure, the case cap 125 for coupling to a case back 115 of the watch 100 is provided. As used herein, the second face 115 of the housing 105 corresponds to the case back 115 of the watch 100. The case cap 125 includes a casing 126 that has a first side 127 configured to mate with the case back 115 of the watch housing 105 and a second side 128 comprises a planar surface 129 configured to be laser engraved or acid engraved.

Although for purposes of describing the case cap 125 and the case back 115 (i.e., the second face 115 of the housing 105), a watch 100 has been illustrated and described as being generally circular, it is to be understood that it is within the scope of the disclosure that the case cap 125 and the case back 115 may be made in any shape, such as square, rectangular, octagonal, oval, elliptical, triangular, or any other shape that may be desired.

In one optional implementation, the case cap 125 of the second aspect of the disclosure also includes an opening 135 arranged on the first side 127 of the casing 126 and configured to receive a case cap retainer 130 therethrough. The casing 126 defines a cavity 136 in communication with the opening 135. The cavity 136 is sized and shaped to receive at least a portion of the case cap retainer 130 and to permit rotation of a retention rim 133 of the case cap retainer 130.

The case cap 125 includes, in an example implementation, at least one male or female component 141, 142 of a reciprocal locking mechanism 140 coupled to the first side 127 of the casing 126. In one variation, the at least one male or female component 141, 142 of the reciprocal locking mechanism 140 includes at least one ball detent coupled to or defined by the first side 127 of the case cap 125. In another variation, the at least one male or female component 141, 142 of the reciprocal locking mechanism 140 includes at least one ball plunger coupled to the first side 127 of the case cap 125.

In one optional implementation, shown in FIGS. 17-18, the at least one male or female component 141, 142 of the reciprocal locking mechanism 140 includes two male or female components 141, 142 (or a combination thereof) arranged 180 degrees apart such that they are opposite each other.

In still another optional implementation, a shape of the opening 135 in the case cap 125 is oval, triangular, rectangular, pentagonal, or hexagonal (see, e.g., illustrations of example case cap retainers 130 having the same shape as the case cap opening 135 in FIGS. 9 and 11-14).

In yet another optional implementation, the cavity 136 of the case cap 125 is sized and shaped to permit the retention rim 133 of the case cap retainer 130 to rotate at least 15 degrees. Still further, the cavity 136 of the case cap 125 is optionally sized and shaped to permit the retention rim 133 of the case cap retainer 130 to rotate up to seventy-five degrees.

In a further optional implementation, an outer circumference 124 of the case cap 125 is chamfered. In a further implementation, as shown in FIGS. 1 and 4-5, an outer circumference 124 of the case cap 125 may be grooved in a repeating manner.

Although a watch 100 and a case cap 125 for attachment thereto have been described and illustrated in accordance with the present disclosure for purposes of illustrating the manner in which the apparatus may be advantageously used, it is to be appreciated that the disclosure is not limited thereto. Therefore, any and all variations and modifications that may occur to those skilled in the applicable art are to be considered as being within the scope and spirit of the claims as appended hereto.

The invention claimed is:

1. A watch, comprising:

a housing having a first face and a second face and a cavity extending therebetween, wherein the first face comprises a first bezel coupled to a first transparent watch crystal;

a disc disposed within the cavity between the first face and the second face and coupled to the housing, wherein the disc comprises a watch face for indicating time;

a case cap removably coupled to the second face of the housing, wherein the case cap comprises a casing having a first side configured to mate with the second face of the housing and a second side configured to be engraved; and a case cap retainer coupled to the second face of the housing, wherein the case cap is removably coupled to the case cap retainer, and wherein the case cap has an opening arranged on the first side of the casing and is configured to receive the case cap retainer therethrough, wherein the casing defines a cavity in communication with the opening, wherein the cavity is sized and shaped to receive at least a portion of the case cap retainer and to permit rotation of a retention rim of the case cap retainer to a locked position on the housing such that the retention rim of the case cap retainer is out of alignment with the opening of the casing of the case cap.

2. The watch according to claim 1, wherein the case cap retainer has a support at a first end coupled to the second face of the housing and the retention rim at a second end.

3. The watch according to claim 1, wherein a shape of the opening in the case cap and a shape of the retention rim are the same.

4. The watch according to claim 3, wherein the shape of the retention rim is oval, triangular, rectangular, pentagonal, or hexagonal.

5. The watch according to claim 1, further comprising at least one locking mechanism having reciprocal male and female components coupled to the first side of the casing of the case cap and the second face of the housing.

6. The watch according to claim 5, wherein the at least one locking mechanism is in the form of a ball detent coupled to or defined by one of the second face of the housing and the first side of the casing of the case cap and a ball plunger coupled to the other of the second face of the housing and the first side of the casing of the case cap.

7. The watch according to claim 5, wherein the male and female components of the at least one locking mechanism are out of alignment when the case cap retainer is received through the opening of the casing of the case cap in an unlocked position, and wherein the male and female components of the at least one locking mechanism are aligned and mated together in the locked position.

8. The watch according to claim 7, wherein the cavity of the case cap is sized and shaped to permit the retention rim of the case cap retainer to rotate at least 15 degrees.

9. The watch according to claim 8, wherein the cavity of the case cap is sized and shaped to permit the retention rim of the case cap retainer to rotate up to seventy-five degrees.

10. The watch according to claim 7, wherein the at least one locking mechanism comprises two locking mechanisms arranged 180 degrees apart on the second face of the housing and 180 degrees apart on the first side of the case cap.

11. The watch according to claim 1, wherein an outer circumference of the case cap contains at least one through-hole configured to receive a removable connector in the form of a threaded screw, wherein the second face of the housing comprises at least one threaded cavity configured to receive the threaded screw when the at least one through-hole of the case cap is concentrically aligned with the at least one threaded cavity in the second face of the housing.

12. The watch according to claim 1, wherein a second side of the case cap comprises a planar surface configured to be laser engraved or acid engraved.

13. The watch according to claim 1, wherein an outer circumference of the case cap is chamfered.

14. The watch according to claim 1, wherein the second face of the housing comprises a second bezel coupled to a second transparent watch crystal.

15. The watch according to claim 1, wherein the second face of the housing is opaque.

16. The watch according to claim 1, wherein the disc has a through-hole arranged in the center of the disc, the watch further comprising:

a shaft disposed within the through-hole of the disc;

at least one hand for indicating time coupled to a first end of the shaft between the first face of the housing and a first side of the disc; and a watch movement control system coupled to the second end of the shaft between the second side of the disc and the second face of the housing.

17. The watch according to claim 15, further comprising:

a rotatable knob coupled to the watch movement control system and configured to move the at least one hand for indicating time, wherein the rotatable knob is coupled to a side of the housing between the first face and the second face.

18. The watch according to claim 1, further comprising:

two pairs of lugs extending from opposite ends of the housing between the first face and the second face.

19. A case cap for coupling to a case back of a watch, comprising:

a casing that has a first side configured to mate with a case back of a watch housing and a second side comprises a planar surface configured to be laser engraved or acid engraved-; and an opening arranged on the first side of the casing and configured to receive a case cap retainer therethrough, wherein the casing defines a cavity in communication with the opening, wherein the cavity is sized and shaped to receive at least a portion of the case cap retainer and to permit rotation of a retention rim of the case cap retainer.

20. The case cap according to claim 19, further comprising:

at least one male or female component of a reciprocal locking mechanism coupled to the first side of the casing.

21. The case cap according to claim 20, wherein the at least one male or female component of the reciprocal locking mechanism comprises at least one ball detent coupled to or defined by the first side of the case cap.

22. The case cap according to claim 20, wherein the at least one male or female component of the reciprocal locking mechanism comprises at least one ball plunger coupled to the first side of the case cap.

23. The case cap according to claim 20, wherein the at least one male or female component of the reciprocal locking mechanism comprises two male or female components arranged 180 degrees apart such that they are opposite each other.

24. The case cap according to claim 19, wherein a shape of an opening in the case cap is oval, triangular, rectangular, pentagonal, or hexagonal.

25. The case cap according to claim 19, wherein a cavity of the case cap is sized and shaped to permit a retention rim of a case cap retainer to rotate at least 15 degrees.

26. The case cap according to claim 24, wherein a cavity of the case cap is sized and shaped to permit a retention rim of a case cap retainer to rotate up to seventy-five degrees.

27. The case cap according to claim 19, wherein an outer circumference of the case cap is chamfered, and/or wherein an outer circumference of the case cap is grooved in a repeating manner.

28. The case cap according to claim 19, wherein an outer circumference of the case cap contains at least one through-hole configured to receive a removable connector in the form of a threaded screw, wherein the second face of the housing comprises at least one threaded cavity configured to receive the threaded screw when the at least one through-hole of the case cap is concentrically aligned with the at least one threaded cavity in the second face of the housing.

* * * * *